US008231956B2

(12) United States Patent
Dean et al.

(10) Patent No.: US 8,231,956 B2

(45) **Date of Patent: *Jul. 31, 2012**

(54) RETAIL MERCHANDISING STRIP

(75) Inventors: Ted M. Dean, Brenham, TX (US); William R. Fuller, Burton, TX (US)

(73) Assignee: Tru-Vision Plastics Inc., Brenham, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/895,261

(22) Filed: Sep. 30, 2010

(65) Prior Publication Data

US 2011/0024373 A1 Feb. 3, 2011

Related U.S. Application Data

(63) Continuation of application No. 10/807,866, filed on Mar. 23, 2004, now Pat. No. 7,820,262.

(60) Provisional application No. 60/457,414, filed on Mar. 25, 2003.

(51) Int. Cl.

*B32B 9/00* (2006.01)
*A47H 1/10* (2006.01)
*A47G 29/00* (2006.01)

(52) U.S. Cl. .................... 428/40.1; 428/41.8; 428/42.1; 428/343; 428/906; 248/317; 211/85.15; 211/85.26

(58) Field of Classification Search ................. 428/40.1, 428/41.8, 42.1, 43, 343, 906; 248/317; 211/85.15, 211/85.26

See application file for complete search history.

(56) References Cited

U.S. PATENT DOCUMENTS

| | | | |
|---|---|---|---|
| 2,361,141 | A | 10/1944 | Woolf et al. |
| 2,606,665 | A | 8/1952 | Caswell |
| 2,647,640 | A | 8/1953 | Ellis |
| 4,312,449 | A | 1/1982 | Kinderman |
| 4,422,552 | A | 12/1983 | Palmer et al. |
| 4,667,827 | A | 5/1987 | Calcerano |
| 4,817,805 | A | 4/1989 | Rodriquez |
| 5,366,777 | A | 11/1994 | Brown et al. |
| 6,109,582 | A | 8/2000 | Repaci et al. |
| 6,383,591 | B1 | 5/2002 | Miles et al. |
| 6,405,778 | B1 | 6/2002 | Belt |
| 6,830,795 | B1 | 12/2004 | Downs |
| 6,840,391 | B2 | 1/2005 | Miller et al. |
| 6,929,132 | B2 | 8/2005 | Belt |

*Primary Examiner* — Patricia Nordmeyer

(74) *Attorney, Agent, or Firm* — Charles S. Knobloch; Arnold & Knobloch, L.L.P.

(57) ABSTRACT

A source roll having a first layer of liner paper and a second roll of two-sided adhesive is fed through a pair of rollers having six aligned rotary die cutters sized to cut through only the adhesive layer. The excess adhesive web is peeling off and removed from the process. The liner paper with spaced apart sets of six aligned adhesive dots is then laminated with a clear plastic having two sides, one uncoated and one coated, to allow the clear plastic to be easily rolled up and then unrolled, and the liner paper is peeled off and removed from the process. The material remaining having the adhesive circular dots is cut into six long strips each having six adhesive dots which can be used to display small discrete packages. As a part of marketing small discrete packages of snack foods or other goods, a plurality of the discrete packages are attached to a plurality of adhesive elements, respectively, and the plastic strips with the discrete packages attached thereto are shipped from a manufacturing location to a marketing location.

22 Claims, 7 Drawing Sheets

RETAIL MERCHANDISING STRIP

RELATED APPLICATION

This application claims priority from U.S. Provisional Application No. 60/457,414, filed on Mar. 25, 2003 and is continuation of Ser. No. 10/807,866, filed on Mar. 23, 2004, now U.S. Pat. No. 7,820,262.

FIELD OF THE INVENTION

The invention relates to an apparatus for securing, displaying and dispensing a plurality of packaged goods, and more particularly to such an apparatus which can accommodate a plurality of such packaged goods and be handled as a unitary structure for transportation, display and dispensing purposes, and also relates to a method for making same.

BACKGROUND OF THE INVENTION

Envelope packaged goods have long since been standard items of commerce. While the goods packaged in envelopes vary considerably, traditionally, snack foods have been so packaged. For example, snacks such as potato chips, popcorn, corn chips, sunflower seeds, fried pork rinds, and the like, are packaged in serving envelopes, since it is intended that those single serving envelopes be displayed and dispensed at high traffic locations. For example, snack foods of this nature are displayed and dispensed in taverns, snack shops, convenience stores, grocery stores, super stores and the like.

Since the average serving envelope is relatively small, i.e. configured to hold anywhere from an ounce to six ounces of the snack food, and since ordinarily, a number of the envelopes are displayed at the point of purchase at any one time, the art has experienced a continued difficulty in providing apparatus for displaying and dispensing such envelope packages. In the earliest of displays, the packages were simply placed in a convenient-sized box or container but such displays never provide a satisfactory solution since the box or container occupied considerable display space even when the box or container have only one or several packages remaining therein. Further, such display requires a considerable amount of flat counter space. In view thereof, the art adopted a vertical display of such packages, which minimizes the counter space required for such display. One of the earliest vertical displays consisted of a rack with a plurality of spring clips thereon. In this apparatus, each individual package was manually inserted into a spring clip for suspension and display purposes. While this approach minimizes the counter space required for display and dispensing, it entails considerable labor, since as packages are dispensed they must be manually replaced on the display. Since the ordinary profit margin in packaged snack foods is not very great, the amount of labor involved in such replenishing of the supply on the individual spring clips caused considerable economic disadvantage.

While the present invention has, as one of its preferred embodiments, the use of merchandising strips for marketing snack foods such as bags of chewing gum, candy, nuts, beef jerky, potato chips, popcorn, corn chips, sunflower seeds, fried pork rinds, and the like, typically packaged as single servings in small envelopes, the invention is not limited to such envelope packaged goods. The strips, according to the present invention, also find utility in marketing of other goods, not necessarily in envelopes, but also envisions the marketing of any types of goods which can be attached to or on or in sheets of material which can be attached and then removed from the adhesive elements which are laminated to such merchandising strips. These additional goods can be comprised of, for example, small tins of chewing tobacco. The invention also contemplates the use of such strips also to market so-called blister packages. Accordingly, the invention is in no way intended to be limited by anything other than the appended claims and their equivalents.

PRIOR ART

There have been various attempts to provide improved merchandising strips for such purposes, such as those described in U.S. Pat. Nos. 2,361,141; 2,606,665; 2,647,640; 4,312,449; 4,422,552; 4,667,827 and 4,817,805.

BRIEF DESCRIPTION OF THE DRAWINGS

FIG. 6(*b*) illustrates a top pictorial view of a rotary die cutter which is used in practicing the invention;

FIG. 6(*c*) illustrates a pictorial side view of the die cutter illustrated in FIG. 6(*b*);

DETAILED DESCRIPTION OF THE DRAWINGS

Figure 1:
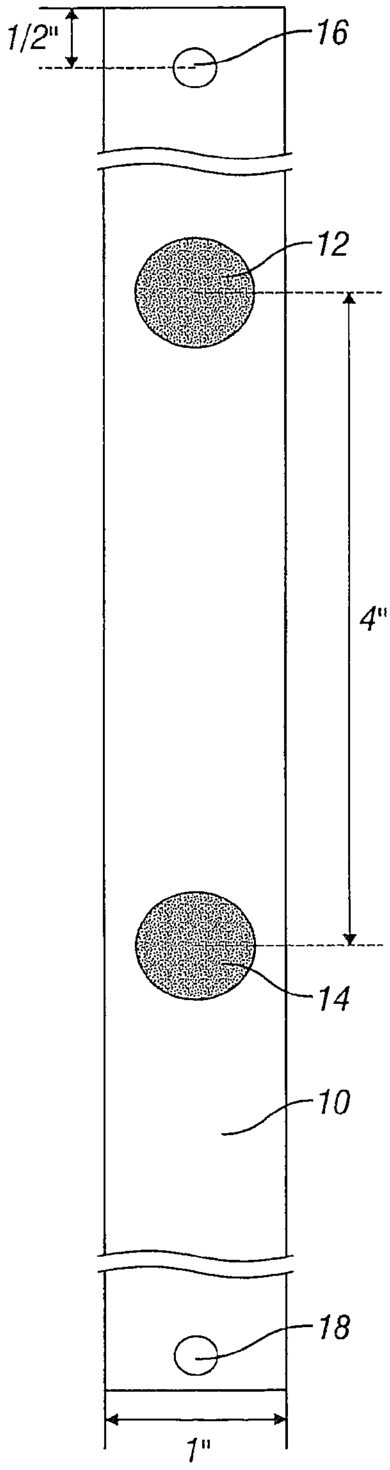
FIG. 1 is a top plan view of a portion of a merchandising strip according to the invention.

Referring now to FIG. 1, there is illustrated a thin strip of clear plastic 10, having a thickness, for example, of 1/64" to 1/32", and preferably being 1" wide. The strip 10 is preferably either 1' or 2' long, as explained with respect to FIG. 2. The strip 10 has a pair of holes 16 and 18, one near each end of the strip 10. Either one of the holes 16 or 18 can be used to hang over a nail, screw or other hanger such as an "S" hanger to provide a vertical display. By having two holes 16 and 18, it does not matter which direction the packaged goods are attached to the adhesive elements. Each of the holes 16 and 18 are preferably cut into the strip 10 at a distance of ½' from the respective ends of the strip 10. The strip 10 also illustrates a pair of adhesive elements 12 and 14, with their center points being spaced 4" apart, to which the merchandise, small sacks of potato chips, for example, can be easily attached for display and sale. The adhesive elements are, for example, circular in shape, approximately 11/16" in diameter, but can be of various geometric configurations, as for example, as illustrated in FIG. 9. The center point of the adhesive element 12 is spaced approximately 2⅛" from the nearest end of the strip 10.

While the preferred embodiment contemplates the dimensions and shapes set forth above, those skilled in the art will recognize that the dimensions and shapes herein set forth are only exemplary.

Figure 2:
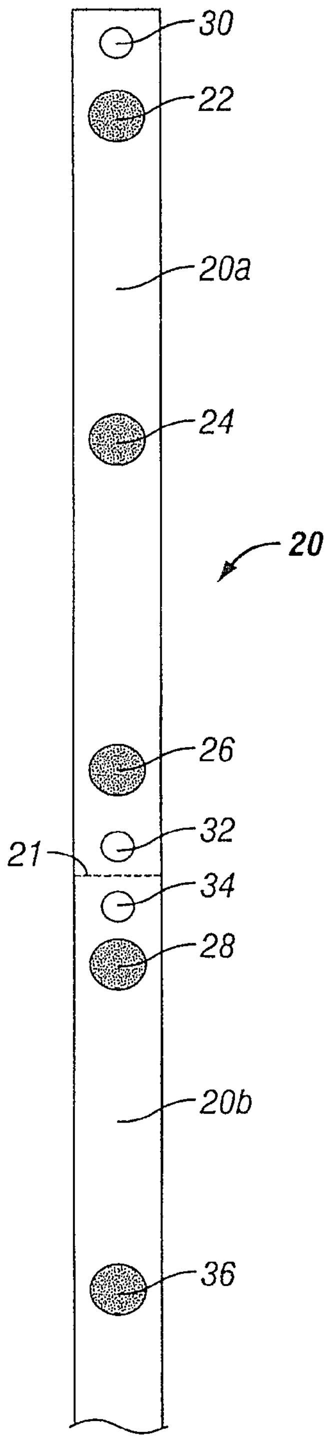
FIG. 2 is a top plan view of the merchandising strip according to FIG. 1, but expanded to show a longer portion of the strip.

Referring now to FIG. 2, the strip 20, which is an expanded view of the strip 10 of FIG. 1, illustrates a top strip 20*a* having three adhesive elements 22, 24 and 26, and a pair of holes 30 and 32. A perforated line 21 separates the top strip 20*a* and the lower strip 20*b* having a pair of spaced adhesive elements 28 and 36 illustrated, but which would also include a third adhesive element. Likewise, the lower strip 20*b* has a single hole 34 illustrated, but would have a second hole, to thus provide a pair of holes at opposite ends of the strip 20*b* in the same manner holes 30 and 32 are provided at opposite ends of strip 20*a*.

In use, the perforated line 21 can be left intact to provide a single strip having six adhesive elements, or torn apart to provide two pairs of strips each having three adhesive elements.

Figure 3:
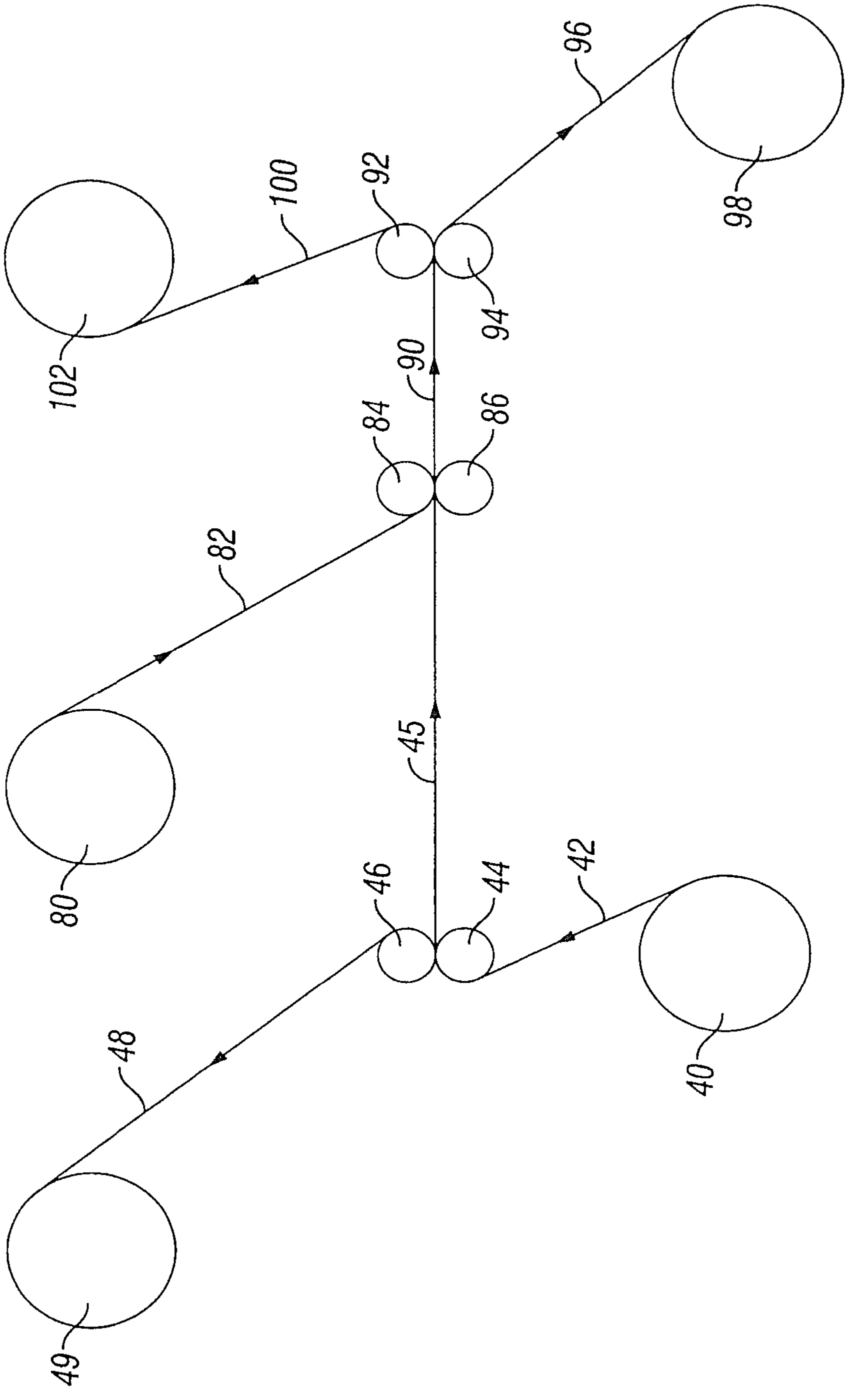
FIG. 3 is a block diagram of the equipment used in the method according to the present invention to manufacture the merchandising strips according to FIGS. 1 and 2.
Figure 4:
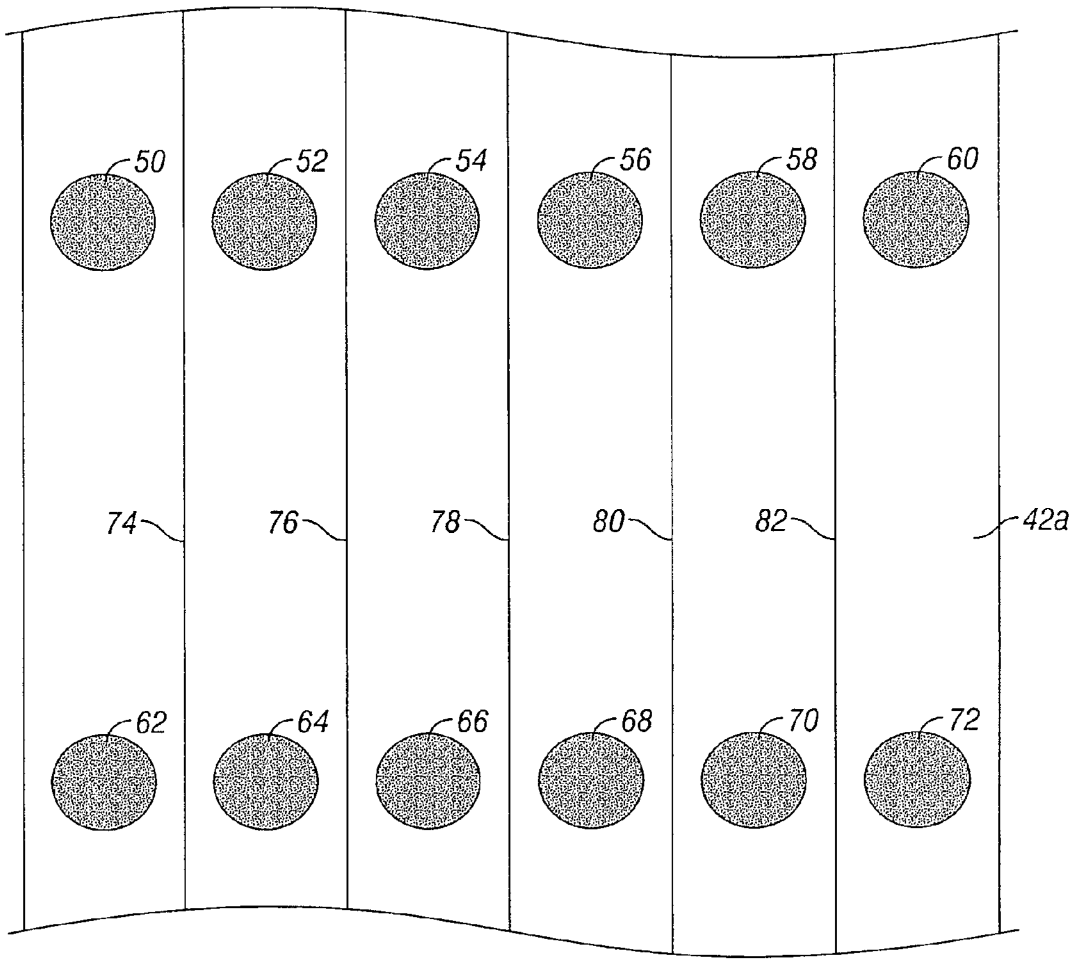
FIG. 4 is a top plan view of two rows of six adhesive elements adhered to a six-inch layer of clear plastic as being moved through a portion of the process equipment illustrated in FIG. 3.
Figure 5:
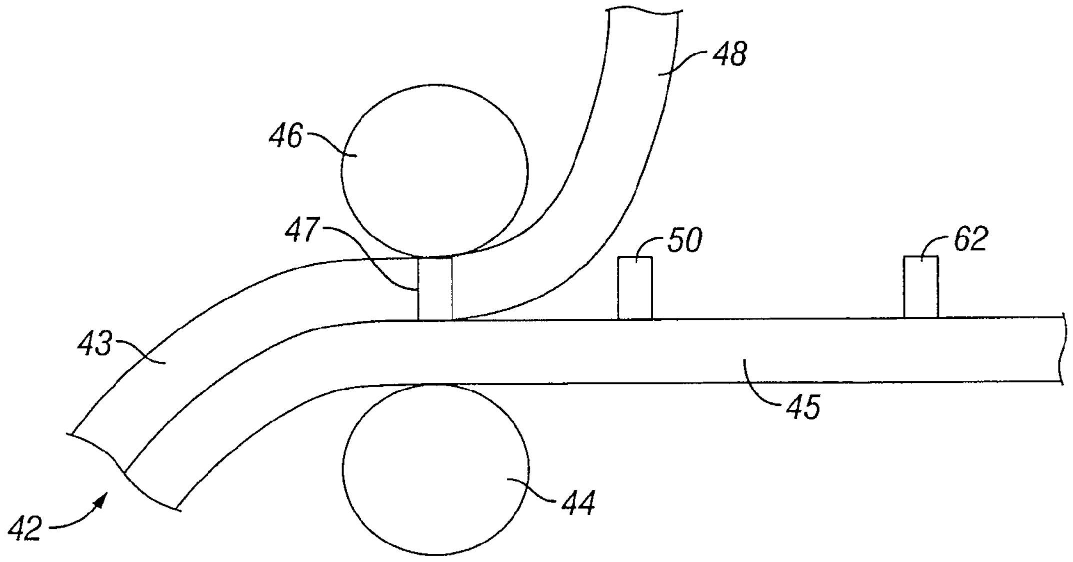
FIG. 5 is a diagrammatic, elevated view of a rotary die cutter associated with running a two-sided adhesive layer and a liner paper through a pair of rollers according to the invention.
Figure 6A:
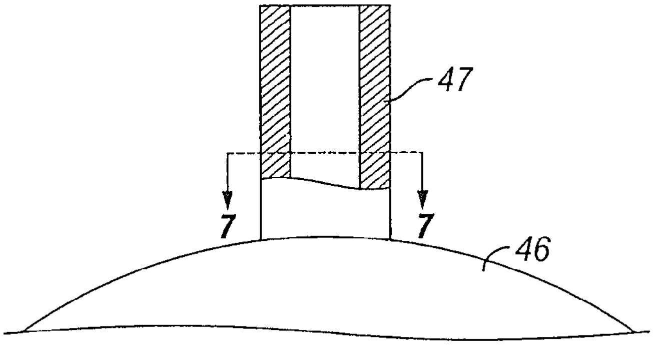
FIG. 6(*a*) illustrates, graphically, an enlarged view, partly in cross-section, of the rotary die cutter illustrated in FIG. 5.
Figure 7:
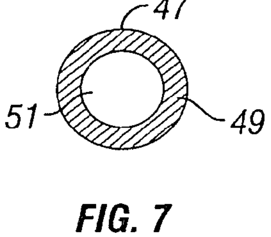
FIG. 7 is a sectional view taken along the sectional line 7-7 of FIG. 6(*a*)
Figure 6B:
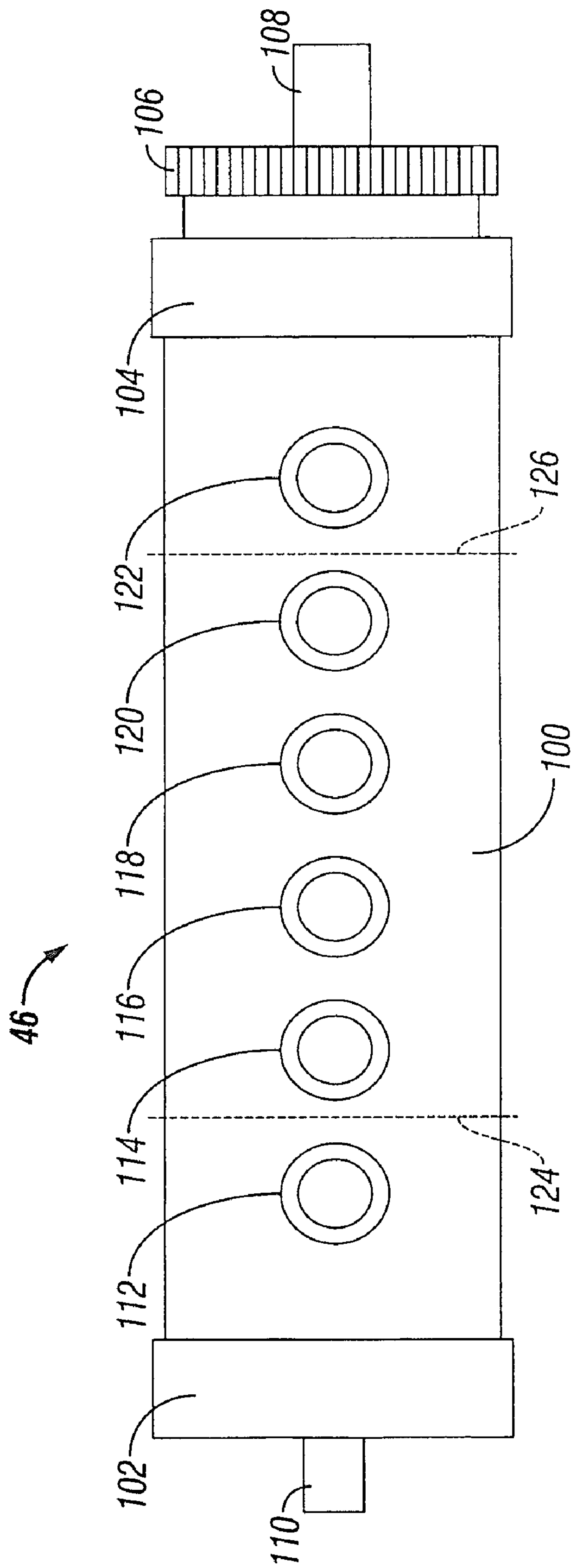
Figure 6C:
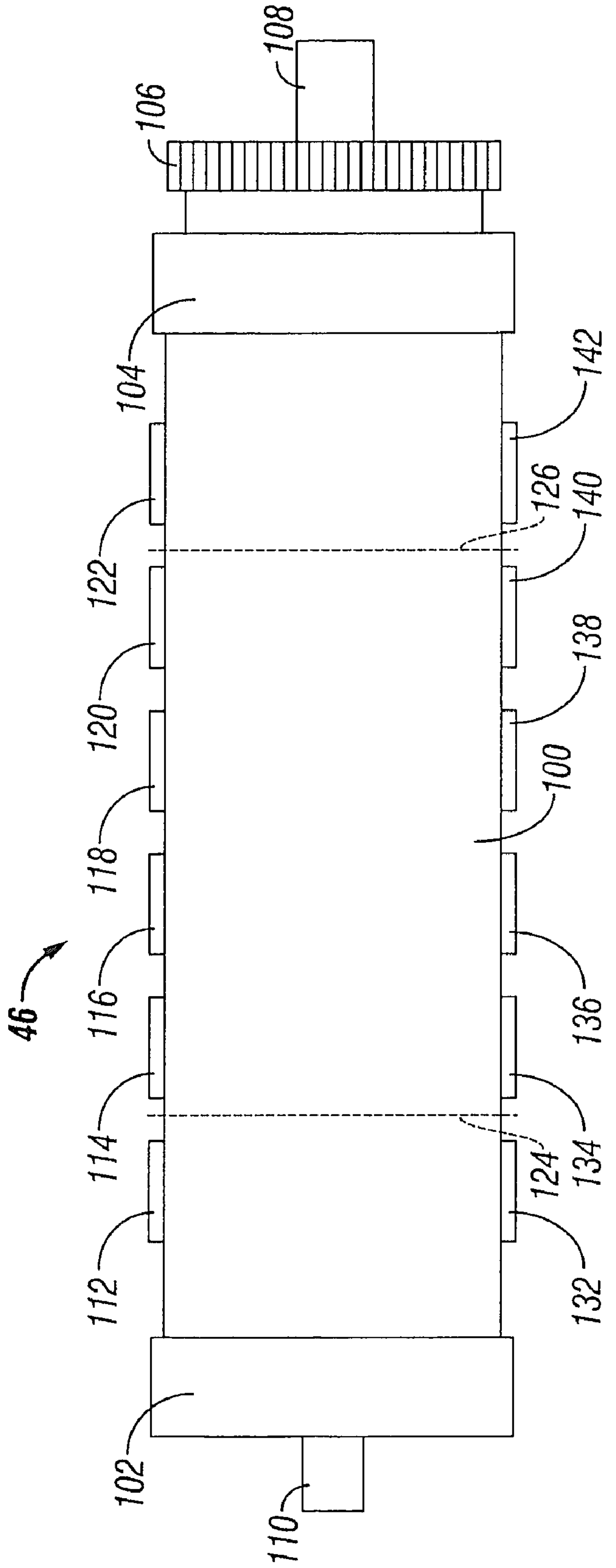

Referring now to FIG. 3, the system illustrated is used to make the strips 10 and 20 illustrated in FIGS. 1 and 2, in accord with the process according to the invention. A roll 40, six inches wide, having a first layer 45 of liner paper and a second layer 43 (See FIG. 5) of two-sided adhesive having one of its two sides which slightly adheres to the liner paper, is available as a double sided pressure sensitive adhesive, PN # Macbond IB-1182, manufactured by Mactac in Stow, Ohio. The output off the roll 40 having the adhesive and the liner paper together, identified by the line 42, passes through the pair of rollers 44 and 46, which also have six aligned circular cutters, each on a line perpendicular to the longitudinal axis of the liner paper. The rotary die cutters are available either from American Die-Tech, PN # NA-Custom of Atlanta, Ga., or Wilson Manufacturing of Saint Louis, Mo. The rotary cutters built into the rollers 44 and 46 are sized to cut through only the depth of the second layer 43 of two-sided adhesive but not through or into the first layer of liner paper 45, as illustrated in FIGS. 5, 6 and 7. The included six cutters are spaced to cut the adhesive elements 50, 52, 54, 56, 58 and 60 illustrated in FIG. 4 and then the adhesive elements 62, 64, 66, 68, 70 and 72. Every four inch movement of the paper 42 results in six more of the adhesive elements.

As illustrated in FIG. 5, the circular cutter 47 is illustrated as just cutting through the depth of the adhesive layer 43. The depth of the cut is usually predetermined when buying the rotary cutters.

The spacing between one set of adhesive elements, exampled above as being every four inches, is a function of the circumference of the roller 46, and is also a function of the number of cutters around the perimeter of the roller 46. As but one example, if a second cutter such as cutter 47 is located 180 degrees from cutter 47, the spacing between sets of adhesive elements will be halved. The roller 44 is sometimes referred to in this art as an anvil, usually manufactured from steel or other hard metal, or even hard plastic such as high density polyurethane to enhance the effect of using the die cutters to cut holes through all or a portion of the material passing between the rollers 44 and 46. The roller 44 would typically be of the same or similar length, but can have a smaller, larger, the same or similar diameter as the roller 46.

Referring now to FIG. 6(*b*), there is illustrated a top pictorial view of a roller 46 which corresponds to the roller 46 which is schematically illustrated in FIGS. 5 and 6. The roller 46 includes a solid cylindrical body 100 having a pair of raised cylindrical end portions 102 and 104, each of which has a diameter only slightly exceeding the diameter of roller body 100. A pair of shafts 108 and 110 are located at opposite ends of body 100. In use, the shafts 108 and 110 will be rotatedly mounted in a pair of housings which allow the body 100 to rotate about the respective axes of shafts 108 and 110. Located adjacent to shaft 108 is a cylindrical gear 106 which is used to rotate body 100 by a conventional drive motor (not illustrated), which is synchronized to rotate the gear 106, which is synchronized to cause the films passing between the roller 46 and the anvil roller 44 to move at the same speed as said films are being taken up further along in the process illustrated in FIG. 3, all as is well known in the art.

The body 100 in FIG. 6(*b*) has six rotary die cutters 112, 114, 116, 118, 120 and 122. Located between the cutters 112 and 114 is a guide member 124 which goes completely around the perimeter of body 100 and is also illustrated in FIG. 6(*c*). A second such guide member 126 is similarly located between cutters 120 and 122. The guide members 124 and 126 are spaced apart, raised segments which contact the film which is being cut by cutters 112-122 to help maintain the film moving along and being cut by cutters 112-122.

Referring now to FIG. 6(*c*), the same roller 46 is illustrated but rotated ninety degrees from the orientation of the roller 46 illustrated in FIG. 6(*b*). In FIG. 6(*c*), there is illustrated six additional cutters 132, 134, 136, 138, 140 and 142. The cutters 132 to 142 are identical to cutters 112-122 but are oriented 180 degrees apart, thus causing the cutters 132-142 to cut six additional patterns into the adhesive film 43.

As illustrated in FIG. 7, the cross-sectional view of the cutter 47 illustrates a thin wall 49 which cuts a circular pattern which produces a circular adhesive area which is identical in size to the center portion 51 of the cutter 47. Thus, an adhesive "dot" is left on the paper liner 45 and the remaining web 48 is peeled off and wound onto the take-up roll 49. Although only the one cutter 47 is illustrated in FIGS. 5 and 7, six such cutters as illustrated in FIG. 6(*b*) are used to cut the six adhesive dots or elements 50, 52, 54, 56, 58 and 60, and also the dots 62, 64, 66, 68, 70 and 72 as illustrated in FIG. 4. The adhesive elements 50 and 62 as shown FIG. 5 carried by the liner paper 45 are spaced, for example, four inches apart.

Referring now to FIG. 9, the eight geometric configurations (a), (b), (c), (d), (e), (f), (g) and (h) illustrate, respectively, that the adhesive elements may take different shapes and configurations which are determined essentially only by the shape of the rotary die cutters, such as the cutter 47 of FIGS. 5-7. For example, FIG. 9(*a*) is a circle; FIG. 9(*b*) is a triangle; (FIG. 9(*c*) is a square; FIG. 9(*d*) is a hexagon; FIG. 9(*e*) is a rectangle; FIG. 9(*f*) is a pentagon; FIG. 9(*g*) is a star; and FIG. 9(*h*) is an oval Although only eight such geometric configurations are shown, the adhesive elements can have any configuration desired, depending only on the particular rotary die cutters which are used.

Referring again to FIG. 3, as the combination 42 passes through the rollers 44 and 46 with their six parallel cutters, the excess web 48 which had previously surrounded the adhesive elements, is peeled off and fed onto the take-up roller 49. As a result of removing the surrounding web 48, the liner paper 45 transports only the adhesive elements 50, 52, 54, 56, 58 and 60, and then the adhesive elements 62, 64, 66, 68, 70 and 72, etc.

Figure 8:
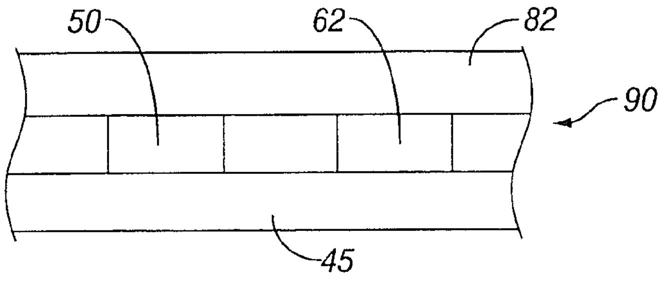
FIG. 8 schematically illustrates the orientation of the clear plastic sheet, the adhesive elements and the paper liner prior to and during the lamination process according to the invention.
Figure 9A:
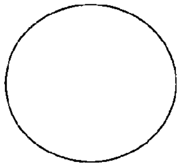
FIG. 9A-9H graphically illustrates various geometric configurations for the adhesive elements according to the invention.
Figure 9B:
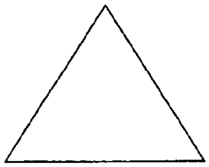
Figure 9C:
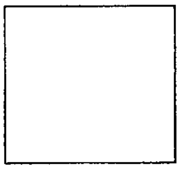
Figure 9D:
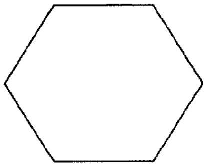
Figure 9E:
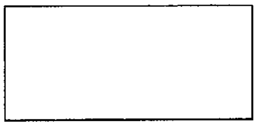
Figure 9F:
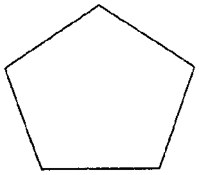
Figure 9G:
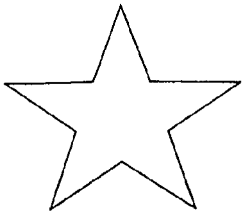
Figure 9H:
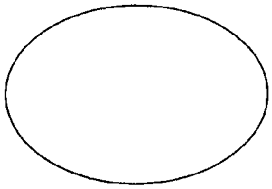

A roll 80 of six inch wide clear plastic, having a release coating on one side available from Douglas Hanson, PN # U-8122, Hammond, Wis., has an output 82 which passes through a pair of rollers 84 and 86 which causes the clear plastic to be laminated to the combined liner paper and adhesive elements. The release coating on one side of the clear plastic is achieved by the use of a silicone mixture coating having a determined thickness, and sometimes requires some adjustment of the silicone content, but not excessive, depending upon the projected use of the plastic. The side of the plastic which is laminated to the adhesive elements has no such coating, thus allowing a better adhesion to the adhesive elements. By having the other side coated with a release coating of a silicone mixture, the strips of clear plastic can be rolled up without adhering to each other. The PN # U-8122 has just the right amount of releaseability. If the silicone coating has an excessive silicone content, the roll will unwind too easily and if the coating has too little silicone content, it will tend to stick together. The clear PVC plastic roll 80 is available from Klockner Pentaplast, PN # TH 557/00-16200 GLGL, located in Rural Retreat, Va. The adhesive elements adhere quite strongly to the uncoated side of the clear plastic. As illustrated in FIG. 8, the clear plastic 82 is aligned on the side of the adhesive elements 50 and 62 away from the liner paper 45 to allow the liner paper to be peeled off once the lamination process is complete. The laminated clear plastic, liner paper and the adhesive elements, collectively identified by the numeral 90, then passes through the pair of rollers 92 and 94. The rollers 92 and 94 also have cutters, also available either from American Die-Tech, PN # NA-Custom of Atlanta, Ga., or Wilson Manufacturing or Saint Louis, Mo., which cut the six inch wide clear plastic into six, one inch wide strips analogous to the phantom lines 74, 76, 78, 80 and 82 of FIG. 4, and also cuts the holes 30, 32, 34 etc. shown in FIG. 2, as well as the perforation line 21.

The liner paper, shown by the line 96, is peeled back at its front edge, and coupled onto a take-up reel 98. The final product, being only the clear plastic having the adhesive elements laminated thereto, and identified by the numeral 100, are then wound onto the take-up reel 102. The final product 100 is identical to the strips 10 and 20 illustrated in FIGS. 1 and 2.

In the preferred mode of this invention, the roll 102 of the finished product 100 is shipped from, for example, the potato chip manufacturer, by attaching the bags of potato chips to the two-foot length of the product such as is illustrated and described in FIG. 2 by placing the bags of potato chips, or other packaged products, directly onto the six adhesive elements. The strip 20 illustrated in FIG. 2, having six bags of potato chips, or other packaged products, adhered thereto, is shipped to the marketing store for resale.

What is claimed is:

1. A merchandising strip for displaying a plurality of discrete packages, comprising:

an elongated, narrow strip of plastic capable of supporting a plurality of discrete packages having a package weight range of one to six ounces, said strip of plastic having a plurality of edges along a longitudinal axis, said strip of plastic having a first coated side and a second side; and a plurality of pre-shaped adhesive elements spaced from the longitudinal edges of the strip, said plurality of adhesive elements having an adhesive substance, each adhesive element capable of removably adhering to a discrete package of the plurality of discrete packages;

wherein said plurality of adhesive elements are laminated on top of the surface of said second side of said strip of plastic, whereby the edges of said adhesive element are exposed above the surface of said second side;

wherein the coating of said first coated side is substantially non-adhesive to said plurality of adhesive elements, whereby ease in rolling and unrolling the merchandising strip along the longitudinal axis is enabled by said coated side and adhesive element combination; and wherein the merchandising strip is positioned and arranged into a rolled state along the longitudinal axis of the plastic strip.

2. The merchandising strip according to claim 1, wherein said adhesive element comprises a pressure sensitive adhesive having a typical peel adhesion of ten pounds per square inch under PSTC-3 test method and typical thickness of carrier plus adhesive of 0.0034 inches.

3. The merchandising strip according to claim 1, wherein said coated side comprises a thickness of silicone, wherein said thickness exceeds the amount necessary to allow the merchandising strip to be rolled up without adhering to itself and wherein said thickness does not exceed the amount necessary to allow the merchandising strip roll to unwind.

4. The merchandising strip according to claim 1, wherein said coated side and adhesive element combination comprises a thickness of silicone coating in combination with IB-1182 pressure sensitive adhesive.

5. The merchandising strip according to claim 1, wherein said strip of plastic comprises PVC plastic.

6. The merchandising strip according to claim 1, wherein said strip of plastic comprises PVC plastic and wherein said coated side comprises a thickness of silicone.

7. The merchandising strip according to claim 1, wherein said strip of plastic comprises PVC plastic and said coated side and adhesive element combination comprises a thickness of silicone coating in combination with IB-1182 pressure sensitive adhesive.

8. The merchandising strip according to claim 1, wherein said strip of plastic is clear plastic.

9. The merchandising strip according to claim 1, wherein said adhesive elements each have a circular configuration.

10. The merchandising strip according to claim 1, wherein said adhesive elements each have a rectangular configuration.

11. The merchandising strip according to claim 1, wherein said strip has first and second ends and has a hole near one end of said strip, to allow said strip to be hung vertically for display.

12. A merchandising strip for displaying a plurality of discrete packages, comprising:

an elongated, narrow strip of plastic capable of supporting a plurality of discrete packages having a package weight range of one to six ounces, said strip of plastic having a plurality of edges along a longitudinal axis, said strip of plastic having a first coated side and a second side; and a plurality of pre-shaped adhesive elements, said plurality of adhesive elements having an adhesive substance, each adhesive element capable of supporting and removably adhering to a discrete package of the plurality of discrete packages, said plurality of adhesive elements laminated on top of the surface of said second side of said strip of plastic, whereby the edges of said adhesive element are exposed above the surface of said second side;

wherein the coating of said first coated side is substantially non-adhesive to said plurality of adhesive elements, whereby ease in rolling and unrolling said plastic strip along the longitudinal axis is enabled by said coated side and adhesive element combination; and wherein the merchandising strip is positioned and arranged into a rolled state along the longitudinal axis of the plastic strip.

13. The merchandising strip according to claim 12, wherein said adhesive element comprises a pressure sensitive adhesive having a typical peel adhesion of ten pounds per square inch under PSTC-3 test method and typical thickness of carrier plus adhesive of 0.0034 inches.

14. The merchandising strip according to claim 12, wherein said coated side comprises a thickness of silicone, wherein said thickness exceeds the amount necessary to allow the merchandising strip to be rolled up without adhering to itself and wherein said thickness does not exceed the amount necessary to allow the merchandising strip roll to unwind.

15. The merchandising strip according to claim 12, wherein said coated side and adhesive element combination comprises a thickness of silicone coating in combination with IB-1182 pressure sensitive adhesive.

16. The merchandising strip according to claim 12, wherein said strip of plastic comprises PVC plastic.

17. The merchandising strip according to claim 12, wherein said strip of plastic comprises PVC plastic and wherein said coated side comprises a thickness of silicone.

18. The merchandising strip according to claim 12, wherein said strip of plastic comprises PVC plastic and said coated side and adhesive element combination comprises a thickness of silicone coating in combination with IB-1182 pressure sensitive adhesive.

19. The merchandising strip according to claim 12, wherein said strip of plastic is clear plastic.

20. The merchandising strip according to claim 12, wherein said adhesive elements each have a circular configuration.

21. The merchandising strip according to claim 12, wherein said adhesive elements each have a rectangular configuration.

22. The merchandising strip according to claim 12, wherein said strip has first and second ends and has a hole near one end of said strip, to allow said strip to be hung vertically for display.

* * * * *